United States Patent [19]

Hitschfel et al.

[11] 4,233,026
[45] Nov. 11, 1980

[54] REDUCING GRINDING TIME AND COMPOSITIONS THEREFOR

[75] Inventors: Gerhard Hitschfel, Niedernhausen; Peter Jürges, Eppstein; Rudolf Munk, Floersheim, all of Fed. Rep. of Germany

[73] Assignee: Hoechst Aktiengesellschaft, Frankfurt am Main, Fed. Rep. of Germany

[21] Appl. No.: 58,293

[22] Filed: Jul. 17, 1979

Related U.S. Application Data

[63] Continuation-in-part of Ser. No. 862,581, Dec. 20, 1977, abandoned.

[30] Foreign Application Priority Data

Dec. 21, 1976 [DE] Fed. Rep. of Germany ....... 2657774

[51] Int. Cl.$^3$ ............... D06M 13/18; D06P 1/16; D06P 1/60; C09K 11/02
[52] U.S. Cl. ................. 8/52; 106/308 Q; 252/301.21; 427/212; 8/604; 8/650
[58] Field of Search ............ 8/92, 173, 93, 1 W, 8/79; 252/301.21; 106/308 Q

[56] References Cited

U.S. PATENT DOCUMENTS

| | | | |
|---|---|---|---|
| 2,930,792 | 3/1960 | Fleysher | 8/70 |
| 2,997,362 | 8/1961 | Baumann | 8/93 |
| 3,056,644 | 10/1962 | Radley | 8/93 |
| 3,069,220 | 12/1962 | Dawson | 8/93 |
| 3,236,583 | 2/1966 | Hees | 8/93 |
| 3,313,590 | 4/1967 | Delano | 8/93 |
| 3,617,211 | 11/1971 | Dawson | 8/175 |
| 3,706,525 | 12/1972 | Blackwell | 8/93 |
| 3,713,769 | 1/1973 | Beal et al. | 8/93 |
| 3,802,905 | 4/1974 | Beyer | 8/173 |
| 3,888,624 | 6/1975 | Blackwell | 8/93 |
| 3,960,486 | 6/1976 | Daubach | 8/169 |
| 4,042,320 | 8/1977 | Becker | 8/173 |
| 4,069,013 | 1/1978 | Hett et al. | 8/79 |

FOREIGN PATENT DOCUMENTS

| | | | |
|---|---|---|---|
| 599015 | 5/1960 | Canada | 8/79 |
| 988258 | 4/1976 | Canada | 8/93 |
| 79466 | 11/1969 | Fed. Rep. of Germany | 8/173 |
| 2008983 | 9/1970 | Fed. Rep. of Germany | 8/173 |
| 2113835 | 9/1972 | Fed. Rep. of Germany | 8/169 |
| 2336777 | 2/1975 | Fed. Rep. of Germany | 8/21 C |
| 2348518 | 4/1975 | Fed. Rep. of Germany | 8/79 |
| 2502154 | 7/1975 | Fed. Rep. of Germany | 8/93 |
| 1338317 | 1/1963 | France | 8/79 |
| 713541 | 8/1954 | United Kingdom | 8/93 |

OTHER PUBLICATIONS

*American Dyestuff Reporter*, Oct. 10, 1955, pp. 22A to 23A.

*Primary Examiner*—Joseph L. Schofer
*Assistant Examiner*—Maria S. Tungol
*Attorney, Agent, or Firm*—Berman, Aisenberg & Platt

[57] ABSTRACT

A composition containing a sparingly soluble or insoluble dyestuff which comprises, as a processing agent, from 0.5 to 50 percent by weight of the composition of at least one water-soluble non-ionic compound of the formula Y—O—Z—H wherein Y represents a hydrogen atom or a group of the formula

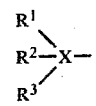

(in which X is a carbon atom or an aromatic ring system having from 6 to 10 carbon atoms, and $R^1$, $R^2$ and $R^3$, which may be the same or different, represent hydrogen atoms, or alkyl or alkenyl groups, with the proviso that at least one of $R^1$, $R^2$ and $R^3$ is other than a hydrogen atom and the total number of carbon atoms in $R^1$, $R^2$ and $R^3$ is not more than 36); and Z represents a $(C_2H_4O)_m$ or $(C_3H_6O)_n$ group or a combination thereof (in which m and n, which may be the same or different, each represents an integer from 2 to 15), and which may additionally contain water, at least one water-soluble anionic compound of formula $R^4$—$SO_4$—A in which A represents an alkali-metal or ammonium cation and $R^4$—$SO_3$ represents a group obtained by reacting a polyvinyl alcohol (having an average molecular weight of at least 10,000) with an aliphatic or aromatic aldehyde (containing at least one sulphonic acid group), or $R^4$ represents (a) an alkoxy group having 10 to 18 carbon atoms in the alkyl moiety; (b) an alkoxy-ether group of the formula Alk—O—$(Z)_p$ having 12 to 18 carbon atoms in the alkyl radical (in which Z is as previously defined and p is an integer of from 2 to 5), (c) an aralkyl group having from 6 to 15 carbon atoms in the alkyl moiety or (d) an alkyl group having 10 to 18 carbon atoms and substituted with a sulphonic acid group on a secondary carbon atom and/or a dispersing agent.

28 Claims, No Drawings

REDUCING GRINDING TIME AND COMPOSITIONS THEREFOR

This application is a continuation-in-part of application Ser. No. 862,581, filed Dec. 20, 1977 now abandoned.

This invention relates to preparations of substances influencing colour tone, such as dyestuffs and optical brighteners.

In the dyeing and printing of textiles, use is made of certain dyestuffs which are insoluble or only sparingly-soluble in water and also of optical brighteners, in the form of finely-distributed aqueous dispersions, often in the form of pastes, that is, soft, semi-liquid or semi-solid masses. When conventional diluting and dispersing agents are used, the degree of fineness required to achieve the optimum effectiveness of such substances can only be obtained with extended time consumption due to wet grinding in conventional wet-grinding units.

The hitherto-known methods of grinding these substances do not facilitate the preparation of highly-concentrated pastes, as the high viscosity of the grinding materials means that the products can only be pumped, if at all, with considerable, uneconomical use of resources.

We have now surprisingly found that the processing of such substances is favourably influenced when non-ionic, water-soluble organic substances, derived from ethylene oxide and/or propylene oxide and aromatic or aliphatic compounds containing hydroxy groups, are added to the aqueous dyestuff composition.

Thus, according to one aspect of the present invention there is provided an aqueous composition containing a sparingly-soluble or insoluble dyestuff which comprises, as a processing agent, from 0.5 to 50% by weight of the composition of at least one water-soluble non-ionic compound of the formula

$$Y-O-Z-H \quad (I)$$

wherein Y represents a hydrogen atom or a group of the formula

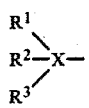

in which X is a carbon atom or an aromatic ring system having from 6 to 10 carbon atoms, and $R^1$, $R^2$ and $R^3$, which may be the same or different, represent hydrogen atoms or alkyl (preferably having from 1 to 4 carbon atoms) or alkenyl (preferably having from 1 to 4 carbon atoms) groups, with the proviso that at least one of $R^1$, $R^2$ and $R^3$ is other than a hydrogen atom and the total number of carbon atoms in $R^1$, $R^2$ and $R^3$ is not more than 36, and Z represents a $(C_2H_4O)_m$ or $(C_3H_6O)_n$ group or a combination thereof (in which m and n, which may be the same or different, each represents an integer from 2 to 15).

The term "dyestuff" as used herein is intended to include within its scope organic pigments, vat dyes, dispersion dyestuffs and optical brighteners.

The compounds of formula I, for use in compositions according to the invention, enable the viscosity of high-solids-content pastes to be lowered and thus the long grinding times hitherto required in the preparation of dyestuff dispersions may be reduced by up to about 50%. The compounds of formula I are preferably present in the compositions of the invention in an amount of from 1 to 20% by weight based on the total composition. The total number of carbon atoms in $R^1$, $R^2$ and $R^3$ of the compounds of formula I is preferably not more than 30 and most preferably not more than 22. In these compounds, m and n essentially represent the number of molecules of alkylene oxide used for their preparation, and preferably represent an integer from 2 to 6. If X represents an aromatic ring system, each of the groups $R^1$, $R^2$ and $R^3$ preferably contains from 1 to 12 carbon atoms.

Examples of compounds of formula I for use in the compositions of the invention are, for example, non-ionic polyether glycol compounds (i.e. Y is hydrogen), fatty alcohol polygylcol ethers (i.e. X is carbon) and aryl or alkyl arylpolyglycol ethers (i.e. X is an aromatic ring system).

Fatty alcohol polyglycol ethers can be prepared by reacting alcohols with ethylene and/or propylene oxide, and examples of such alcohols are primary straight-chained or branched alkanols and alkenols preferably having from 8 to 22 carbon atoms and most preferably 12 to 18 carbon atoms, such as, for example, 2-ethylhexanol, dodecan-1-ol, octadecan-1-ol, isotridecyl alcohol, coconut oil alcohol, aliphatic alcohols obtainable by the oxo process or by the Ziegler process, sperm oil alcohols having various iodine numbers and unsaturated fatty alcohols, such as oleyl alcohol, obtained by selective reduction of unsaturated fatty acids.

Preferred alkyl-arylpolyglycol ethers of formula I which may be used in the compositions of the invention are, for example, mono-, di- and trialkyl-arylpolyglycol ethers, the alkyl groups of which have together not more than 36, preferably not more than 30 and advantageously not more than 22, carbon atoms, and contain 2 to 15 molecules of alkylene oxide added on. Examples of such compounds are n- and iso-butyl-phenol-octaethylene glycol ethers, xylenol-pentaethylene glycol ether, cresol-tetraethylene glycol ether, di-(n-butyl)-phenol-decaethylene glycol ether, tri-(n-butyl)-phenol-undecaethylene glycol ether, di-(n-butyl)-cresol-octaethylene glycol ether, di-(n-butyl)-naphthol-dodecaethylene glycol ether and corresponding isomers, dodecyl-phenol-dodecaethylene glycol ether, isopropyl-naphthyl-decaethylene glycol ether, and also addition compounds derived from 14 moles of ethylene oxide to 1 mole of isohexyl- and isoheptyl-naphthol, and from 12 moles of ethylene oxide to 1 mole of octyl-, nonyl- or dinonyl-phenol.

The compounds of formula I are generally used in aqueous solution. When used in the compositions of the invention for grinding to prepare dispersions, their good solubility in water and low foam production are particularly advantageous. Due to their good wetting properties grinding material is largely prevented from floating or becoming lumpy.

A further advantage of the use of the compounds of formula I in the preparation of ground pastes is the ability to prepare ground pastes, which are inherently substantially homogeneous, of higher concentrations than hitherto realised; that is, the proportion of dyestuff in the ground material may, if desired, be increased up to a value of 50% by weight of the total ground paste. It preferably lies between 30 and 50% by weight. The pastes comprise, therefore, up to 69.5% by weight of water. The dyestuff may also be milled with a compound of formula I in the absence of water. The resulting milled compositions are thus those which, in water-free form, consist essentially of two components, a sparingly-soluble or water-insoluble dyestuff and a compound of formula I. Naturally, when water is present, there are at least three components including water. The expression "in water-free form" thus indicates merely that water may, but need not, be present.

The compositions of the present invention may be prepared by adding the dyestuff, with stirring, to aqueous solutions of the compound(s) of formula I at temperatures between 0° and 80° C., preferably between 20° and 40° C., and grinding in a conventional wet grinding unit (such as, for example, a colloid mill, e.g. a carborundum or tootheddisc mill), a ball mill, or an agitator-type ball mill (e.g. a pearl or sand mill). Before the grinding it is advantageous, in order to reduce grinding times further, to pass the compositions through a dispersing unit, e.g. a disperser, a colloid mill or a turbine mixer.

Examples of dyestuffs which are sparingly soluble or insoluble in water are, for example, methine-, anthraquinone-, nitro, and azo-dyestuffs, and brighteners based on benzoxazole, benzofuranedioxazole, coumarin, etc.

It is advantageous to add to the compositions of the present invention at least one water-soluble anionic compound of the formula

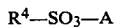  (II)

in quantities up to 50% by weight, preferably 10 to 30% by weight, in relation to the total mixture. In this formula, A represents an alkali-metal or ammonium cation, preferably a sodium, potassium, ammonium or lithium cation and $R^4$—$SO_3$ represents a group obtained by reacting a polyvinyl alcohol (having an average molecular weight of at least 10,000) with an aliphatic or aromatic aldehyde (containing at least one sulphonic acid group) and in which the originally-present hydroxy groups are reacted wholly or only partly with the aldehyde component, or $R^4$ represents a) an alkoxy group having 10 to 18 carbon atoms in the alkyl moiety, b) an alkoxy-ether group of the formula Alk—O—$(Z)_p$ having 12 to 18 carbon atoms in the alkyl moiety (in which Z is as hereinbefore defined and p is an integer of from 2 to 5), c) an aralkyl group having from 6 to 15, preferably 9 to 12, carbon atoms in the alkyl moiety, or d) an alkyl group substituted on a secondary carbon atom with a sulphonic acid group and having 10 to 18, preferably 12 to 16, carbon atoms. Aldehydes which may be used in the formation of $R^4$ are, e.g., the monosulphonic and disulphonic acid derivatives of acet-, propion-, butyr-, benz- and tolyl aldehyde.

Examples of compounds of formula II are linear or branched alkane or olefin sulphonates having from 4 to 30, preferably 10 to 18, carbon atoms, unbranched alkylaryl sulphonates having from 6 to 30, preferably 10 to 18, carbon atoms, fatty alcohol sulphates and fatty alcohol ether sulphates. Fatty alcohols which may be used to prepare these sulphates are the fatty alcohols mentioned above for compounds of formula I. The number of molecules of alkylene oxide added on in the preparation of fatty alcohol ether sulphates is preferably 2 to 5. Compounds of this type prevent premature re-agglomeration of the particles finely and extremely-finely distributed by grinding.

The advantageous properties of ground pastes (formed from the compositions of the present invention) achieved by the addition of compounds of formula I, such as grinding times reduced, e.g., by up to 50%, lower viscosities, wetting of the dyestuffs, low foaming and achievement of higher solids concentrations, are maintained on the addition of compounds of formula II. The latter compounds may be added to the composition at any time during a grinding operation, that is, before or after the dyestuff component is stirred in or before or after dispersion of the ground material.

A dispersed composition having the desired final dyestuff concentration may be prepared after grinding by addition of conventional dispersing agents and water or an aqueous solution of these substances, which then have a water content of up to 95, suitably up to 90, preferably up to 80, percent by weight based on the total dispersed composition. By the addition of such dispersing agents or mixtures thereof, optimum stability of the dispersions may be achieved, even after long storage of the finely-distributed ground material and under the conditions of subsequent application. Examples of conventional dispersing agents are, for example, polyvinyl alcohols, lignin sulphonates, sugars or hydroxyethylated sugars, polyethylene glycols of formula I, methyl cellulose and derivatives thereof, and condensation products containing sulphonic acid groups obtained by condensing cresols and aromatic compounds (containing at least two condensed 6-membered rings, such as naphthalene) with formaldehyde and sodium sulphite. The quantity of dispersing agents is generally 5 to 30% by weight, preferably 6 to 12% by weight, in relation to the final dispersion.

To increase storage stability still further, the dispersion may also have added to it one or more further compounds of formula II.

To prevent mould forming during storage, the finished dispersion may preferably have added to it from 0.2 to 0.4% by weight, relative to the total mixture, of a conventional preservative.

For feeding to the grinding units, the wetting capacity of the substances to be ground is of great importance. Products which are difficult to wet should be combined with the grinding liquid in portions before the start of grinding, e.g., by being passed several times through colloid mills. Thus, for example, the wetting capacity of optical brighteners of the benzoxazole type in aqueous polyvinyl alcohol solutions is regarded as inadequate.

The following Examples serve to illustrate the present invention. In the Examples parts represent parts by weight and percentages represent percentages by weight.

EXAMPLE 1A 70 parts of a powdery optical brightener based on benzoxazole C.I. Fluorescent Brightener 315) where added to an aqueous solution of 146 parts of water and 16 parts of xylenolpentaethylene glycol ether, the brightener being completely wetted after 40 seconds without mechanical assistance. After brief stirring, the approximately 30% suspension was ground in a pearl mill with beads 1 to 1.5 mm in diameter. Within 3½ hours the fine distribution required for such pastes (80% <1 mµ, the remainder 2 to 3 mµ) was achieved. The viscosity was 9 mPa.s (Haake Viscosimeter, 20° C.). The ground mixture was then diluted with 7.5% aqueous polyvinyl alcohol solution (viscosity of the 4% aqueous solution at 25° C.: 26 mPa.s) to 1000 parts.

EXAMPLE 1B

To test the dispersion stability, 1 part of a powdery violet-blue vat dye (C.I. VAT Violet 21) was added to the dispersion produced in Example 1A. After a storage time of approximately 3 months, a bluish edge formed on the surface of the dispersion by slight separation of the dyestuff, while the brightener formed a slight deposit. However, it was possible to homogenise the dispersion again by stirring.

EXAMPLE 1C

Example 1B was repeated, with the final dispersion having added to it 8 parts of a reaction product of polyvinyl alcohol having an average molecular weight of 40,000 and butyraldehyde sulphonic acid. In comparison with Example 1B this dispersion showed, after a storage time of approximately 3 months, improved storage stability with regard to signs of agglomeration and sedimentation.

EXAMPLE 2

Example 1A was repeated, but using an amount of water of 140 parts, and also 6 parts of the reaction product mentioned in Example 1C were added. The fine distribution indicated in Example 1A was again achieved after $3\frac{1}{2}$ hours. The mixture was diluted to 1000 parts with polyethylene glycol/water (volume ratio 1:2) (average molecular weight of the polyethylene glycol 400).

COMPARISON EXAMPLE 1

70 parts of the optical brightener mentioned in Example 1A were added to a solution of 180 parts of water and 8 parts of polyvinyl alcohol (100%). Without mechanical assistance the brightener took more than 6 hours to be wetted. By subsequent stirring a suspension was obtained and ground as in Example 1A. The fine distribution indicated in Example 1A was not achieved until after a total grinding time of 8 hours. Viscosity 740 mPa.s. The grinding mixture was then diluted as in Example 1A to 1000 parts.

COMPARISON EXAMPLE 2

Comparison Example 1 was repeated, but with the difference that 160 parts of water, 5 parts of polyvinyl alcohol and 4 parts of a wetting colloid based on an addition product of 22.5 mol of ethylene oxide on 1 mol of oleyl alcohol were used. The fineness of the ground paste mentioned in Example 1A was only achieved after a total grinding time of $7\frac{1}{2}$ hours. Viscosity 126 mPa.s. The mixture was then diluted as in Example 1A to 1000 parts.

EXAMPLE 3

(Highly-concentrated grinding). 46 parts of the brightener mentioned in Example 1A were suspended in a solution of 40 parts of water, 10 parts xylenol-pentaethylene glycol ether and 4 parts of the reaction product mentioned in Example 1C. The approximately 46% suspension was ground as in Example 1A to the desired fine distribution. A grinding time of 4 hours was required. Viscosity 45 mPa.s (20° C.). The mixture was diluted with 7.5% aqueous polyvinyl alcohol solution to 650 parts.

EXAMPLE 4

100 parts of 2-[benzofuranyl-(2)]-5'-[4'-benzofuranyl-(2)-phenyl]-1,3,4-oxadiazole were suspended in a solution of 120 parts of water, 15 parts of cresol-tetraethylene glycol ether and 10 parts of a $C_{13}$-$C_{16}$-alkane sulphonate. The approximately 41% suspension was ground as in Example 1A, the grinding time required to achieve the desired fine distribution was $3\frac{1}{2}$ hours. Viscosity 78 mPa.s (20° C.). The mixture was diluted as in Example 1A to 1000 parts.

EXAMPLE 5

Example 4 was repeated using 20 parts of n-butylphenoloctaethylene glycol ether instead of cresol-tetraethylene glycol ether. The grinding time was $3\frac{1}{2}$ hours. Viscosity 45 mPa.s (20° C.).

What is claimed is:

1. A substantially homogeneous ground composition which, in water-free form, consists essentially of two components: (A) a sparingly-soluble or insoluble dyestuff and (B) from 0.5 to 50 percent by weight of the composition of at least one water-soluble non-ionic compound of the formula $$Y\text{-}O\text{-}Z\text{-}H \qquad (I)$$

wherein
Y is

X is an aromatic ring system having from 6 to 10 carbon atoms;
each of
$R^1$, $R^2$ and $R^3$ is a member selected from the group consisting of hydrogen, alkyl and alkenyl, at least one of $R^1$, $R^2$ and $R^3$ being other than hydrogen, and each of $R^1$, $R^2$ and $R^3$, which is other than hydrogen, having from one to four carbon atoms;
Z represents a member selected from the group consisting of $(C_2H_4O)_m$, $(C_3H_6O)_n$ and a combination thereof; and
each of
m and n represents an integer from 2 to 15.

2. A composition as claimed in claim 1 wherein the compound of formula (I) is a member selected from the group consisting of a monoalkylaryl polyglycol ether, a dialkylaryl polyglycol ether and a trialkylaryl polyglycol ether.

3. A composition as claimed in claim 1 wherein the dyestuff is present in an amount of at most 50 percent by weight based on the total composition.

4. A composition as claimed in claim 1 wherein the compound of formula I is n- or iso-butyl-phenoloctaethylene glycol ether.

5. A composition as claimed in claim 1 wherein the compound of formula I is xylenol-pentaethylene glycol ether.

6. A composition as claimed in claim 1 wherein the compound of formula I is cresol-tetraethylene glycol ether.

7. A composition as claimed in claim 1 wherein the compound of formula I is di-(n-butyl)-phenyl-decaethylene glycol ether.

8. A composition as claimed in claim 1 wherein the compound of formula I is tri-(n-butyl)-phenolundecaethylene glycol ether.

9. A composition as claimed in claim 1 wherein the compound of formula I is di-(n-butyl)-cresol-octaethylene glycol ether.

10. A composition as claimed in claim 1 wherein the compound of formula I is di-(n-butyl)-naphtholdodecaethylene glycol ether.

11. A composition as claimed in claim 1 wherein the compound of formula I is isopropyl-naphthyl-decaethylene glycol ether.

12. A composition according to claim 1 wherein the aromatic ring system of X is that of benzene.

13. A composition according to claim 1 wherein the aromatic ring system of X is that of naphthalene.

14. A substantially homogeneous composition which, in water-free form, consists essentially of
   up to 50 percent, based on the weight of the composition, of at least one water-soluble, anionic compound of the formula $$R^4\text{-}SO_3\text{-}A \qquad (II),$$

in which
   A represents an alkali-metal or ammonium cation and
   $R^4$ is a member selected from the group consisting of
   (a) an alkoxy group having from 10 to 18 carbon atoms in the alkyl moiety;
   (b) an alkoxy ether group of the formula Alk—O—(Z)$_p$, in which Alk is alkyl having from 12 to 18 carbon atoms; Z is as defined in claim 1; and p is an integer of from 2 to 5;
   (c) an aralkyl group having from 6 to 15 carbon atoms in the alkyl moiety; and
   (d) an alkyl group having from 10 to 18 carbon atoms and substituted with a sulphonic acid group on a secondary carbon atom; or
   $R^4$—SO$_3$ is a group obtained by reacting a polyvinyl alcohol, having an average molecular weight of at least 10,000, with an aliphatic or aromatic aldehyde containing at least one sulphonic acid group;
   in combination with
   a two-component composition as claimed in claim 1.

15. A composition as claimed in claim 14 wherein the compound of formula (II) is a member selected from the group consisting of alkane sulfonate, olefin sulfonate having from 4 to 30 carbon atoms, an unbranched alkylaryl sulfonate having from 6 to 30 carbon atoms, a fatty alcohol sulfate and a fatty alcohol ether sulfate.

16. A composition according to claim 14 wherein $R^4$ is (a).

17. A composition according to claim 14 wherein $R^4$ is (b).

18. A composition according to claim 14 wherein $R^4$ is (c).

19. A composition according to claim 14 wherein $R^4$ is (d).

20. A composition according to claim 14 wherein $R^4$—SO$_3$ is a group obtained by reacting a polyvinyl alcohol, having an average molecular weight of at least 10,000 with an aromatic aldehyde containing at least one sulphonic acid group.

21. A composition as claimed in claim 1 wherein the composition is a paste comprising
   (A) 30 to 50 percent by weight of at least one insoluble or sparingly-soluble dyestuff,
   (B) 0.5 to 50 percent by weight of at least one water-soluble compound of formula (I),
   (C) 0 to 69.5 percent by weight of water, and
   (D) 0 to 50 percent by weight of at least one water-soluble, anionic compound of the formula $R^4$—SO$_3$—A (II), in which A represents an alkali-metal or ammonium cation and $R^4$—SO$_3$ is a group obtained by reacting a polyvinyl alcohol having an average molecular weight of at least 10,000 with an aliphatic or aromatic aldehyde containing at least one sulphonic acid group, or $R^4$ is a member selected from the group consisting of (a) an alkoxy group having 10 to 18 carbon atoms in the alkyl moiety, (b) an alkoxy ether group of the formula Alk—O—(Z)$_p$ having from 12 to 18 carbon atoms in the alkyl radical, in which Z is as defined in claim 1, and p is an integer of from 2 to 5, (c) an aralkyl group having from 6 to 15 carbon atoms in the alkyl moiety and (d) an alkyl group having 10 to 18 carbon atoms and substituted with a sulphonic acid group on a secondary carbon atom; all percentages being based on 100 percent of the total composition.

22. A composition as claimed in claim 1 which contains
   (A) at least one insoluble or sparingly-soluble dyestuff,
   (B) at least one water-soluble compound of formula (I),
   (C) up to 95 percent by weight of water,
   (D) at least one water-soluble, anionic compound of formula $R^4$—SO$_3$—A (II), in which A represents an alkali-metal or ammonium cation and $R^4$—SO$_3$ represents a group obtained by reacting a polyvinyl alcohol having an average molecular weight of at least 10,000 with an aliphatic or aromatic aldehyde containing at least one sulphonic acid group; or $R^4$ is (a) an alkoxy group having 10 to 18 carbon atoms in the alkyl moiety, (b) an alkoxy ether group of the formula Alk—O—(Z)$_p$ having from 12 to 18 carbon atoms in the alkyl radical, in which Z is as defined in claim 1, and p is an integer of from 2 to 5, (c) an aralkyl group having from 6 to 15 carbon atoms in the alkyl moiety, or (d) an alkyl group having 10 to 18 carbon atoms and substituted with a sulphonic acid group on a secondary carbon atom; wherein the ratio of the components (A), (B) and (D) is from 30–50:0.5–50:0–50 and which additionally contains
   (E) a dispersing agent in an amount of from 5 to 30 percent by weight, all percentages being based on the total composition of components (A) to (E).

23. A composition as claimed in claim 1 wherein the dyestuff is an optical brightener.

24. A water-free composition according to claim 1.

25. An aqueous composition according to claim 1.

26. A process for reducing grinding time for preparing a dispersion from high-solids-content paste of sparingly-soluble or insoluble dyestuff which comprises grinding the dyestuff as a component in a composition which, in water-free form, consists essentially of:
   (A) said dyestuff, which is a member selected from the group consisting of organic pigment, vat dye, dispersion dyestuff and optical brightener, and (B) from 0.5 to 50 percent by weight of the composition of at least one water-soluble non-ionic compound of the formula

Y-O-Z-H     (I)

wherein
Y is

X is an aromatic ring system having from 6 to 10 carbon atoms;
each of
R$^1$, R$^2$ and R$^3$ is a member selected from the group consisting of hydrogen, alkyl and alkenyl, at least one of R$^1$, R$^2$ and R$^3$ being other than hydrogen, and each of R$^1$, R$^2$ and R$^3$, which is other than hydrogen, having from one to four carbon atoms;
Z represents a member selected from the group consisting of (C$_2$H$_4$O)$_m$, (C$_3$H$_6$O)$_n$ and a combination thereof; and
each of
m and n represents an integer from 2 to 15.

27. A process as claimed in claim 26 wherein from 1 to 20 percent by weight of the composition is a compound of formula (I), and each of m and n is an integer from 2 to 6.

28. A process for reducing grinding time for preparing a dispersion from high-solids-content paste of sparingly-soluble or insoluble dyestuff which comprises grinding the dyestuff as a component in a composition which, in water-free form, consists essentially of:
(A) said dyestuff, which is a member selected from the group consisting of organic pigment, vat dye, dispersion dyestuff and optical brightener,
(B) from 0.5 to 50 percent by weight of the composition of at least one water-soluble non-ionic compound of the formula

Y-O-Z-H     (I)

wherein
Y is

X is an aromatic ring system having from 6 to 10 carbon atoms;
each of
R$^1$, R$^2$ and R$^3$ is a member selected from the group consisting of hydrogen, alkyl and alkenyl, at least one of R$^1$, R$^2$ and R$^3$ being other than hydrogen, and each of R$^1$, R$^2$ and R$^3$, which is other than hydrogen, having from one to four carbon atoms;
Z represents a member selected from the group consisting of (C$_2$H$_4$O)$_m$, (C$_3$H$_6$O)$_n$ and a combination thereof; and
each of
m an n represents an integer from 2 to 15, and
(c) up to 50 percent, based on the weight of the composition, of at least one water-soluble, anionic compound of the formula

R$^4$-SO$_3$-A     (II), in which
A represents an alkali-metal or ammonium cation and
R$^4$ is a member selected from the group consisting of
(a) an alkoxy group having from 10 to 18 carbon atoms in the alkyl moiety;
(b) an alkoxy ether group of the formula Alk—O—(Z)$_p$, in which Alk is alkyl having from 12 to 18 carbon atoms; Z is as previously defined; and p is an integer of from 2 to 5;
(c) an aralkyl group having from 6 to 15 carbon atoms in the alkyl moiety; and
(d) an alkyl group having from 10 to 18 carbon atoms and substituted with a sulphonic acid group on a secondary carbon atom; or
R$^4$—SO$_3$ is a group obtained by reacting a polyvinyl alcohol, having an average molecular weight of at least 10,000, with an aliphatic or aromatic aldehyde containing at least one sulphonic acid group.

* * * * *